United States Patent [19]
Barbier et al.

[11] Patent Number: 5,661,608
[45] Date of Patent: Aug. 26, 1997

[54] LIGHT BOX FOR OPTICAL VALVE

[75] Inventors: Bruno Barbier; Patrick Lach, both of Bordeaux, France

[73] Assignee: Sextant Avionique, Meudon la Foret, France

[21] Appl. No.: 418,440

[22] Filed: Apr. 7, 1995

[30] Foreign Application Priority Data

Apr. 12, 1994 [FR] France ................... 94 04301

[51] Int. Cl.⁶ .................................. G02B 27/02
[52] U.S. Cl. ................ 359/800; 359/619; 362/268; 315/10; 345/98
[58] Field of Search .................. 359/800, 802, 359/810, 546, 530, 619, 621, 455, 457, 50; 362/260, 268, 257; 315/10; 345/148, 98; 250/206.2

[56] References Cited

U.S. PATENT DOCUMENTS

| | | | |
|---|---|---|---|
| 4,807,978 | 2/1989 | Grinberg et al. | 359/619 |
| 4,810,056 | 3/1989 | Migozzi et al. | 359/619 |
| 5,027,359 | 6/1991 | Leger et al. | 359/619 |
| 5,053,764 | 10/1991 | Barbier et al. | 345/148 |
| 5,057,744 | 10/1991 | Barbier et al. | 315/10 |
| 5,139,609 | 8/1992 | Fields et al. | 359/619 |
| 5,239,293 | 8/1993 | Barbier | 345/98 |
| 5,313,054 | 5/1994 | Lach et al. | 250/206.2 |
| 5,392,140 | 2/1995 | Ezra et al. | 359/41 |
| 5,430,816 | 7/1995 | Furuya et al. | 383/33 |

FOREIGN PATENT DOCUMENTS

| | | |
|---|---|---|
| 0 030 875 | 6/1981 | European Pat. Off. . |
| 0 367 332 | 5/1990 | European Pat. Off. . |
| 0 372 525 | 6/1990 | European Pat. Off. . |
| 0 492 721 A2 | 7/1992 | European Pat. Off. . |
| 0 540 140 A1 | 5/1993 | European Pat. Off. . |
| WO 91/18315 | 11/1991 | WIPO . |

OTHER PUBLICATIONS

Patent Abstracts of Japan, vol. 15, No. 367 (E–1112), Sep. 17, 1991, JP-A-03 145 294, Jun. 20, 1991.
English Abstract of Japanese Patent 63–261667, Neon Lamp, Oct. 28, 1988.
English Abstract of Japanese Patent 62–127717, Liquid Crystal Display Device, Jun. 10, 1987.

*Primary Examiner*—Loha Ben
*Attorney, Agent, or Firm*—Oblon, Spivak, McClelland, Maier & Neustadt, P.C.

[57] ABSTRACT

A system of retro-illumination for optical valves integrated into a system of projection is constituted by a plane array of slotted fluorescent tubes, parallel to one another, associated with a plane array of longitudinal lenses parallel to the tubes and spaced out substantially by the same pitch. This system is a compact high-output system. It enables an easy gradation of the luminous level as well as the obtaining a trichromatic sequential retro-illumination without moving parts.

16 Claims, 6 Drawing Sheets

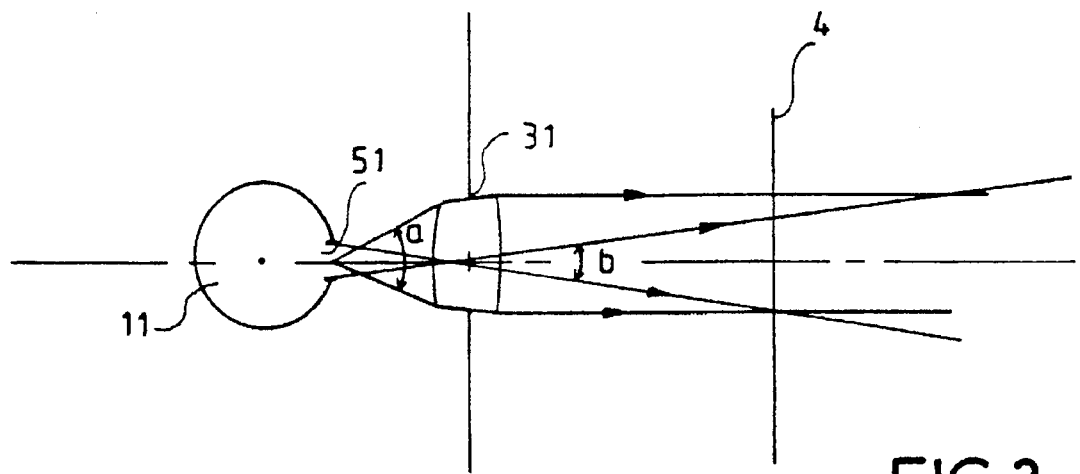
FIG.3a
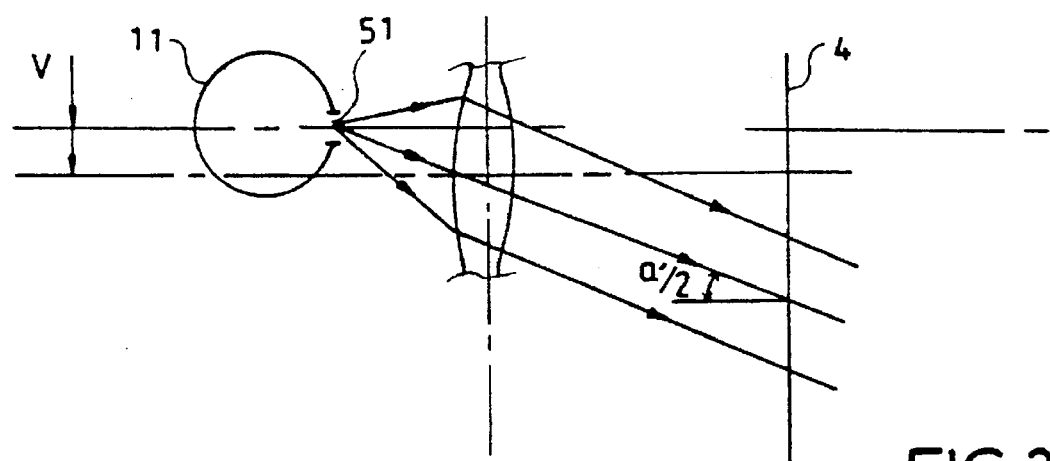
FIG.3b
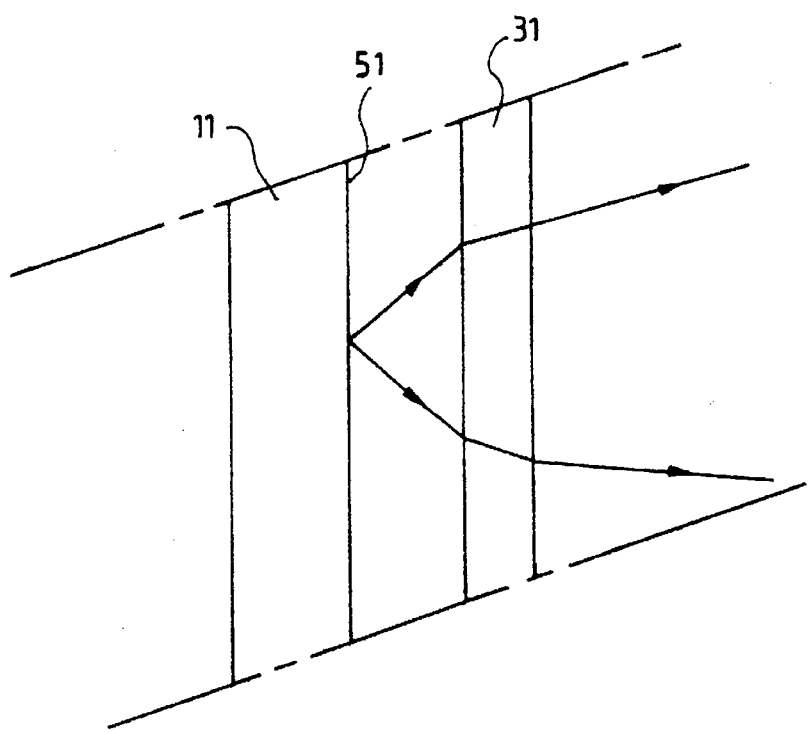
FIG.3c
FIG.3

LIGHT BOX FOR OPTICAL VALVE

BACKGROUND OF THE INVENTION

1. Field of the Invention

The invention relates to the field of illumination devices for optical valves. Such devices are known as light boxes. Optical valves are devices that carry out a spatial and/or temporal filtering of light. The most widely known light boxes are formed by matrix arrays of liquid crystals controlled by matrix arrays of electrodes.

2. Description of the Prior Art

A description of the prior art in this field is given in a report on a communication to the 13th International Colloquium on Research in Display Devices, pages 249–252, September 1993. The report is entitled "A novel projection single light valve high brightness HD color projector".

The author of this article P. JANSSEN (Philips Laboratories, Briarcliff, USA) describes a new valve projector and summarizes the prior art in this field.

Thus, he states (page 249, column 2) that there are two types of single-valve projectors, namely spatial projectors and temporal projectors. With regard to spatial projectors:

"Mosaic color filter: The image of a direct view color display is projected on the screen. Three color pixels represent one resolution element. Unless the pixels are superimposed through some depixellation scheme, still more pixels are needed for a similar quality impression, which further reduces pixel aperture ratio and light transmission. Two-thirds or more of the light is lost in the color filters."

With regard to sequential valves, the following is explained:

"A single light valve is flooded sequentially with red, green and blue light, for instance by spinning a color filter in the illumination path (3). As in the case of mosaic filter projection, the color wheel transmits, on average, only one-third of the optical power."

The author explains that, in both these types of valve, only one-third of the emitted power is available at output. He then describes the principle of a new single-valve projection device with reference to FIG. 1 of the report.

The white light from a small arc lamp is distributed (in a manner known in the prior art) through dichroic filters. From the different colored beams created, an optical system converts the beams into red, green and blue rectangular bands on the valve. These bands are separated by dark spaces. A prism in the optical path acts as a vibrating plate with parallel faces for the shifting, by rotation, of the colored bands on the valve. Whenever a colored band reaches a boundary of the valve, for example the bottom boundary, it is redirected upwards from where it continues it downward movement. The process of permutation of the colors is illustrated in greater detail in FIG. 2 of the report. According to FIG. 2 and the explanations given with respect to the associated electronic circuitry for the control of the valve, it can be understood that the valve is divided into three horizontal rectangular parts, each part corresponding to a colored rectangular beam.

Each of the parts is illuminated alternately, through the rotation of the prism, by a red beam, then a green beam and then a blue beam. When a part is illuminated by the red light for example, the pixels of these parts are activated to filter the red light and give the red part of the image to be projected. Similarly, for the blue and the green. Thus, for an image refreshed 60 times per second, each of the three bands of the screen is refreshed 180 times per second, 60 times with a red image, 60 times with a green image and 60 times with a blue image. Dark parts between the three colored light beams correspond to the time taken by the crystals of the valve to change their state between two successive commands, namely about 3 milliseconds.

Although the technical arrangement described in this document has advantages, notably as regards the luminous power transmitted by the valve, it still has a few drawbacks that shall be referred to here below.

The light source and the associated optical system for shaping the light beam form a fairly bulky unit that notably cannot be used to obtain compact head-up color visors.

Since the light source is a single source, its reliability directly affects that of the display. Finally, whether the light source is an arc lamp, an incandescent source or a fluorescent-lamp-based source with a large surface area, there is always one specific additional drawback pertaining thereto.

Each of these points shall be developed at greater length here below.

An illumination device with a small-sized light source such as the one described in the document referred to has a depth in a direction perpendicular to the plane of the valve that is directly proportional to the size of the diagonal of the valve as explained here below with reference to the appended FIG. 1.

The typical structure of the system for the shaping of a light beam is shown in FIG. 1. A small-sized light source 1 has on one side a spherical mirror 2 sending light emitted by the source 1 to a condenser 3 located on the other side of the source which collimates light beam coming from the reflector 2 and the light beam coming directly from the source 1 in a direction perpendicular to the plane of an optical valve 4.

The value "D" of the diameter of the condenser 3 is approximately equal to the length of the diagonal of the optical valve 4. The condenser 3 and the reflector 2 are positioned on either side of the source 1, the condenser 3 being removed from the source 1 by a distance equal to the focal distance "F" of the condenser. The minimum value of F is approximately equal to the diameter D, given the usual limitation of aperture of the optical systems.

Thus, the minimum value of the shaping system corresponds roughly to a cylinder with a diameter D and a length greater than D, in overlooking the thickness of the condenser 3 and of the reflector 2.

The other shaping systems using for example an elliptical reflector and a parabolic reflector lead to a longitudinal dimension of the same order of magnitude.

In the case of the document referred to, the useful height of the valve is reduced by one-third. This corresponds to a diminishing of the length of the diagonal but it is necessary to add the depth of the rotating system that deflects the light beams and the depth of the system for the anamorphosis of the light beams.

The light source 1 used is either a filament-based incandescent lamp or an arc lamp as in the document referred to. The incandescent lamp has several drawbacks:
- the luminous efficacy is low;
- the fall in the luminous level by variation of the current in the lamp is accompanied by a chromatic drift towards the red and a drop in luminous efficacy.

The arc lamp has other drawbacks:
- the variation in luminance is hard to achieve electrically;
- the efficient discharge of calories prohibits certain operating positions.

These two technologies have other drawbacks in common:

- the concentration of luminous power on a small radiating surface leads to a high concentration of heat which it is difficult to discharge;
- the radiation given is not monochromatic; it is generally white;
- the reliability of the system of illumination is highly dependent on the reliability of the lamp.

For the retro-illumination of the optical valves in direct viewing mode, the characteristics of radiation of the retro-illumination beam are not the same. Another type of light source is used: the fluorescent tube.

Its drawbacks, for projection systems, are:

- the luminance of the radiating surface is low;
- the radiating surface is great;
- the radiated light flux is low.

For valves in direct viewing mode, several fluorescent tubes are thus used to increase the light flux. The shaping system is based on the use of scattering devices working by reflection transmission.

The luminous yield of such a system is low.

Furthermore, this type of system not appropriate for projection because:

- the available light flux is low;
- the direction of radiation given is omnidirectional.

Should the image be given by the display be monochromatic, for example green, as is the case for a head-up visor, a filter could be interposed between the source and the valve to eliminate the undesirable light rays which consequently reduce the luminous yield.

If the image to be given is a color image, it is synthesized either spatially or temporarily from three monochromatic images, red, green and blue, as explained in the introduction to the document referred to.

The spatial synthesis can be done either by using three optical valves or by using a single optical valve.

For the single-valve spatial synthesis, to each pixel there is added a red, green or blue optical filter that reduces the luminous yield. For the three-valve synthesis, the white radiation is split up into three types of radiation, individually red, green or blue having different positions and illuminating each of the valves separately. The optical splitting systems are bulky. Such systems are described for example in the THOMSON CSF patent No. 89.01533 dated Feb. 7, 1989.

For temporal synthesis, a single optical valve is used. Each pixel is retro-illuminated successively by a color beam that is red, green and then blue. The device described in the document referred to exemplifies such a construction.

With reference to the prior art that has just been described, the aims of the invention can be summarized as follows.

The invention is aimed at a light box for an optical valve having:

- a sufficient level of illumination on the optical valve;
- sufficient spatial homogeneity of illumination;
- a direction and a divergence of light flux compatible with the valve and the projection system;
- maximum luminous efficacy for the color considered;
- minimum volume, especially small depth;
- operation in every position;
- maximum gradation of the light level;
- maximum operating security.

The invention is also aimed at ensuring that reliability is not related to a flimsy element such as an arc lamp or an incandescent filament bulb. For color displays, it is aimed at the elimination of the device for splitting the beam coming from the source into several colored beams. It seeks to obtain a stable light source that does not require a high degree of calorific discharge. It finally seeks to obtain a device for the illumination of a valve that comprises no moving parts.

According to the invention, the light source for the retro-illumination of the optical valve is formed by several slotted fluorescent tubes of identical colors positioned in parallel with one another. The shaping system has a longitudinal lens for each of the light tubes. Each lens is positioned in parallel to the tube associated with it and distributes the light from this tube on a band of the valve, this band being parallel to the tube and to the lens.

SUMMARY OF THE INVENTION

More generally, the invention relates to a light box for an optical valve having a surface that can be generated by the shifting of a straight line in parallel to an axial reference direction, the box comprising a light source emitting a light beam and a condenser orienting the light beam with respect to the surface of the valve, wherein this light source is formed by at least one array of n slotted fluorescent tubes, each slot being parallel to the axial direction, and wherein the condenser of each set of tubes is formed by an equal number n of longitudinal lenses parallel to the axial direction, each lens having a plane of optical symmetry containing the axial direction and being perpendicular to the surface of the valve, each lens being located between the light slot and the surface of the valve.

As a general rule, the optical valves currently available in the market are rectangular plane valves. The axial reference direction is then parallel to one of the sides of the rectangle.

When the light box constituted by the array of tubes and the array of associated lenses has to emit a slightly divergent light, each tube slot is positioned exactly facing the lens that is associated with it. This means that the longitudinal plane of symmetry of the slot is also a longitudinal plane of optical symmetry of the lens associated with it. The successive planes of the lenses and slots are equidistant in this case.

When the light box has to send out a divergent light, the distances between the plane of symmetry of the slot and the plane of symmetry of the lens associated with it increase with movement away from a reference plane parallel to the plane of symmetry of the set of the tubes and lenses containing the axial direction, the reference plane possibly being said plane of symmetry.

Finally, when the light box is used with a valve to obtain a color image with spatial or temporal synthesis, three plane arrays of tubes and associated lenses are used. These arrays are positioned, for example, along the faces of a cube. A mixer cube provides, in a known way, for the projection of each of the colors of each set on the valve or, in a manner that is also known, the synthesis is carried out by means of simple or dichroic mirrors.

BRIEF DESCRIPTION OF THE DRAWINGS

The invention and a few modes of use of the invention shall now be described with reference to the appended drawings, of which:

FIG. 3, which includes FIGS. 3a, 3b and 3c, illustrates the variations of emergence of the light rays coming from the condenser as a function of the relative positions of the slot of a tube and its associated lens;

MORE DETAILED DESCRIPTION

Figure 1:
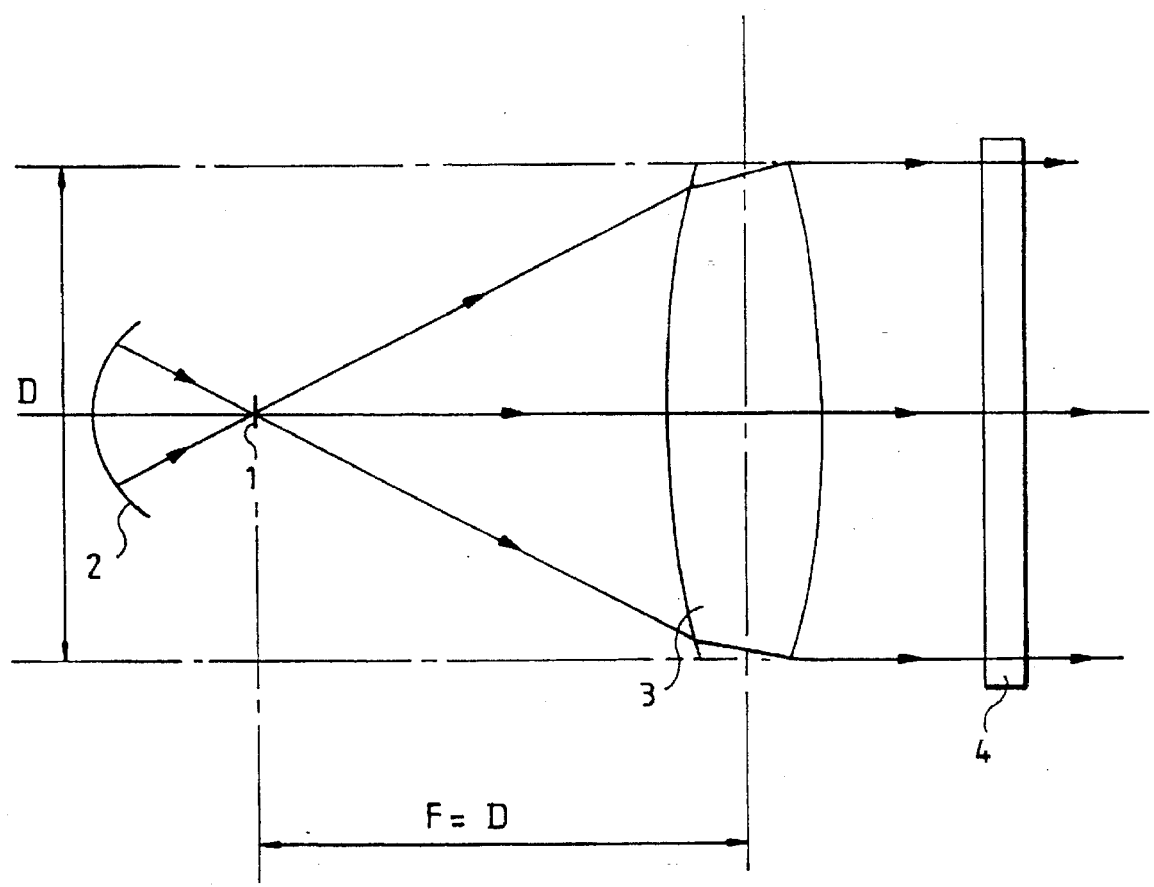
FIG. 1, already described, illustrates a standard retro-illumination system.

FIG. 1 which has already been commented upon is designed to explain the fact that, with the standard light boxes, the depth of the box is at least equal to the diagonal of the associated valve.

Figure 2:
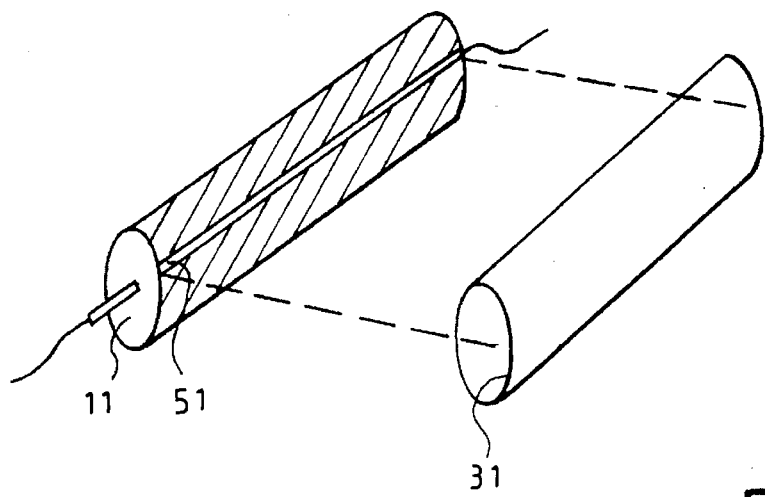
FIG. 2 shows a view in perspective of a slotted tube and its associated lens.

FIG. 2 shows a view in perspective of a slotted tube 11 and its associated longitudinal lens 31.

The elimination of the luminophor along a slot 51 throughout the length of the tube and on a very small portion of its circumference enables the positioning, on this slot, of substantial light radiation. This radiation is further increased if the tube is fitted with a reflector internal to the tube positioned between the glass of the tube and the layer of luminophor. This radiation is approximately Lambertian (with maximum luminous intensity in the direction of the normal to the surface of the slot) and does not require any device, external to the tube, to recover the rear radiation. The luminance through the slot is far greater than on the rest of the surface of the tube. It is also notably greater than the luminance of an unslotted tube. In the embodiments that shall be described here below, the diameter "d" of each tube is 3.8 millimeters. An aperture "e" of 0.5 millimeter, called the slot, is made in the layer of luminophor throughout the length of the tube. The luminance, at this slot, which is greater than 100 kcd/m², is greater than the luminance of the unslotted tube. It is substantially greater (four to five times greater) on the slot than on the rest of the surface of the tube. The desired color is obtained directly by the choice of the luminophor of the fluorescent tube and makes it possible to prevent either the excess increase in volume caused by the system for splitting up the beam into three colored beams or the reduction of the energy yield caused by the absorbent colored filter or filters. The luminous power of the tubes can be modulated over a very wide dynamic range and very swiftly. It is therefore possible to achieve a trichromatic sequential illumination by means of three arrays of tubes having different colors from one array to another and being combined by optical means. The large number of sources increases reliability for, in the event of total malfunctioning of a tube, a part of the luminous flux sent out by the two neighboring tubes, after reflection and scattering on the tubes and rear partition wall, provide illumination in the appropriate direction of the zone of the valve that is normally illuminated by the malfunctioning tube. The distribution of luminous energy over several sources reduces the calorific concentration. FIG. 3 is designed to explain how the relative position of a slot of a tube and of the lens associated with it may be used to modulate the divergence of the light beams at the illuminated optical valve. FIG. 3 comprises FIGS. 3a, 3b and 3c.

FIGS. 3a and 3b are cross-sections showing a tube 11 having its light slot 51 pointed towards a longitudinal collimation lens 31. In FIGS. 3a and 3b, the slot 51 is in the focal plane of the lens 51.

In FIG. 3a, the longitudinal planes of symmetry of the slot 51 and of the lens 31 are merged. The trace of this single plane in the plane of the figure is represented by a line of an axis passing through the center of the tube 11 and the center of the slot 51. It follows that the image of a central point of the slot 51 corresponds to a direction of radiation at output of the lens 31, parallel to the plane of symmetry and perpendicular to a valve 4. In view of the width of the slot, the angle of divergence b of the rays is in the range of 6°.

In FIG. 3b, the longitudinal planes of symmetry of the slot 51 and of the lens 31 are parallel and offset by a distance v. It follows that the image of a central point of the slot corresponds to a direction of radiation forming a non-zero angle of incidence $$\frac{a'}{2}$$

on the valve 4. It is thus seen that a shift between the two planes of symmetry may be used to orient the radiation in a particular direction.

FIG. 3c shows a longitudinal sectional view of a tube 11 and of the lens 31 that is associated with it by the longitudinal plane of symmetry of the slot 51. In this plane perpendicular to the plane of the valve 4 and to the plane of FIGS. 3a and 3b, the illumination is not collimated. The angle of divergence increases with the longitudinal dimensions of the tube.

Exemplary embodiments of the light box according to the invention depending on the use of the valves illuminated by these boxes shall be given here below. First of all, the general form of the invention shall be described with reference to FIG. 4.

Figure 4:
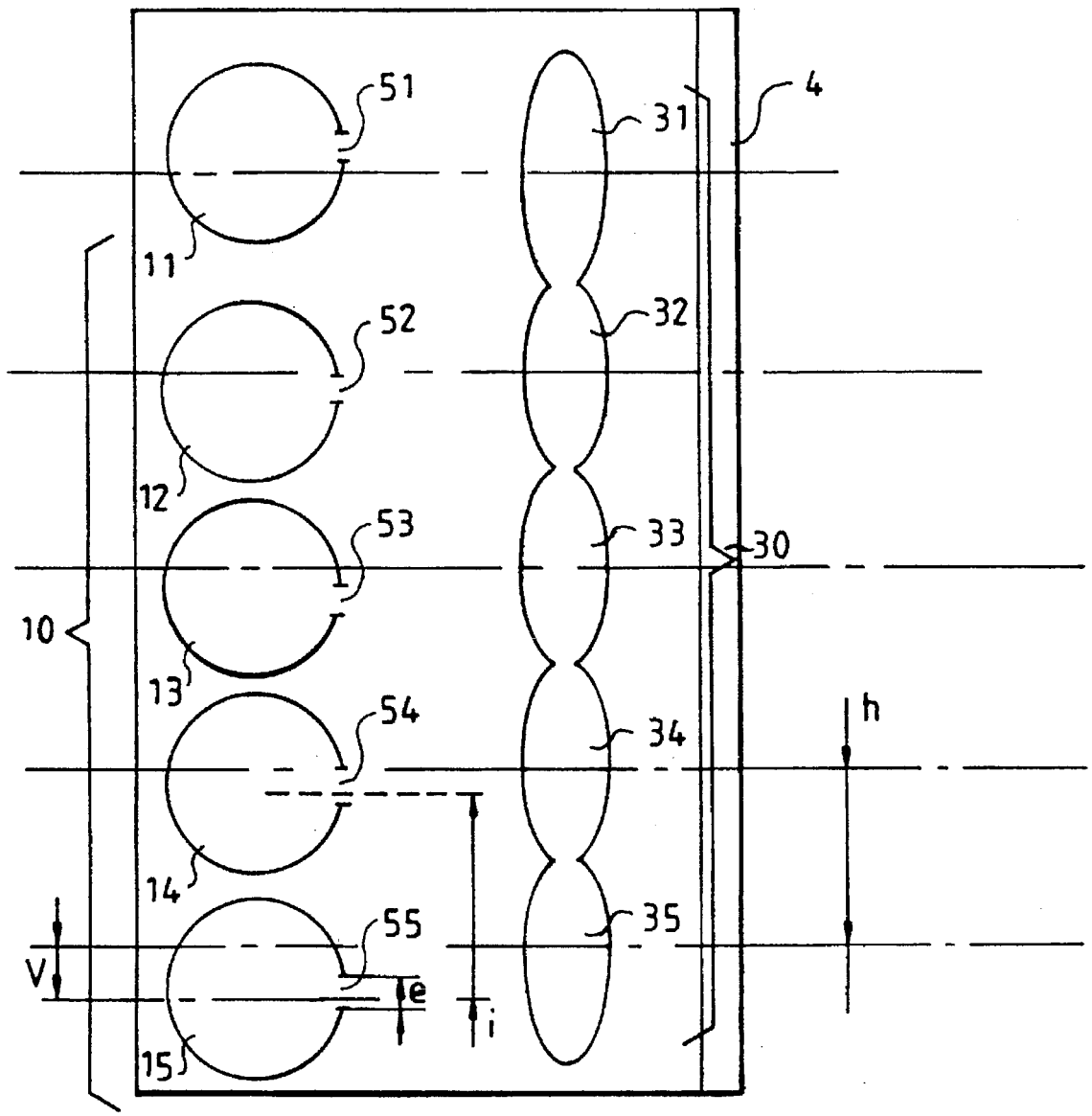
FIG. 4 shows a longitudinal sectional view of a light box according to the invention in its more general form.

FIG. 4 shows a cross-sectional view of an array 10 of tubes (11 to 15) and of an array 30 of associated lenses 31 to 35. The arrays 10 and 30 of tubes and lenses are shown before an optical valve 4. In the depiction of FIG. 4, the axial direction of reference is perpendicular to the plane of the figure. The horizontal direction of FIG. 4 is perpendicular to the plane of the valve 4. The vertical direction of FIG. 4 is parallel to one of the sides of the valve 4. The radiating sources are formed by slots 51 to 55 of the tubes 11 to 15. The traces of the planes of symmetry of the lenses 31 to 35 in the plane of FIG. 4 are represented by lines of axes. The spacing v between the plane of symmetry of a lens and the plane of symmetry of the tube of the array 10 associated with this lens may be variable from one tube to another and depends on the divergence to be obtained at the valve 4. The spacing v may be obtained by variation of the pitch h between lenses or of the pitch i between tubes or by a combination of both.

Figure 5:
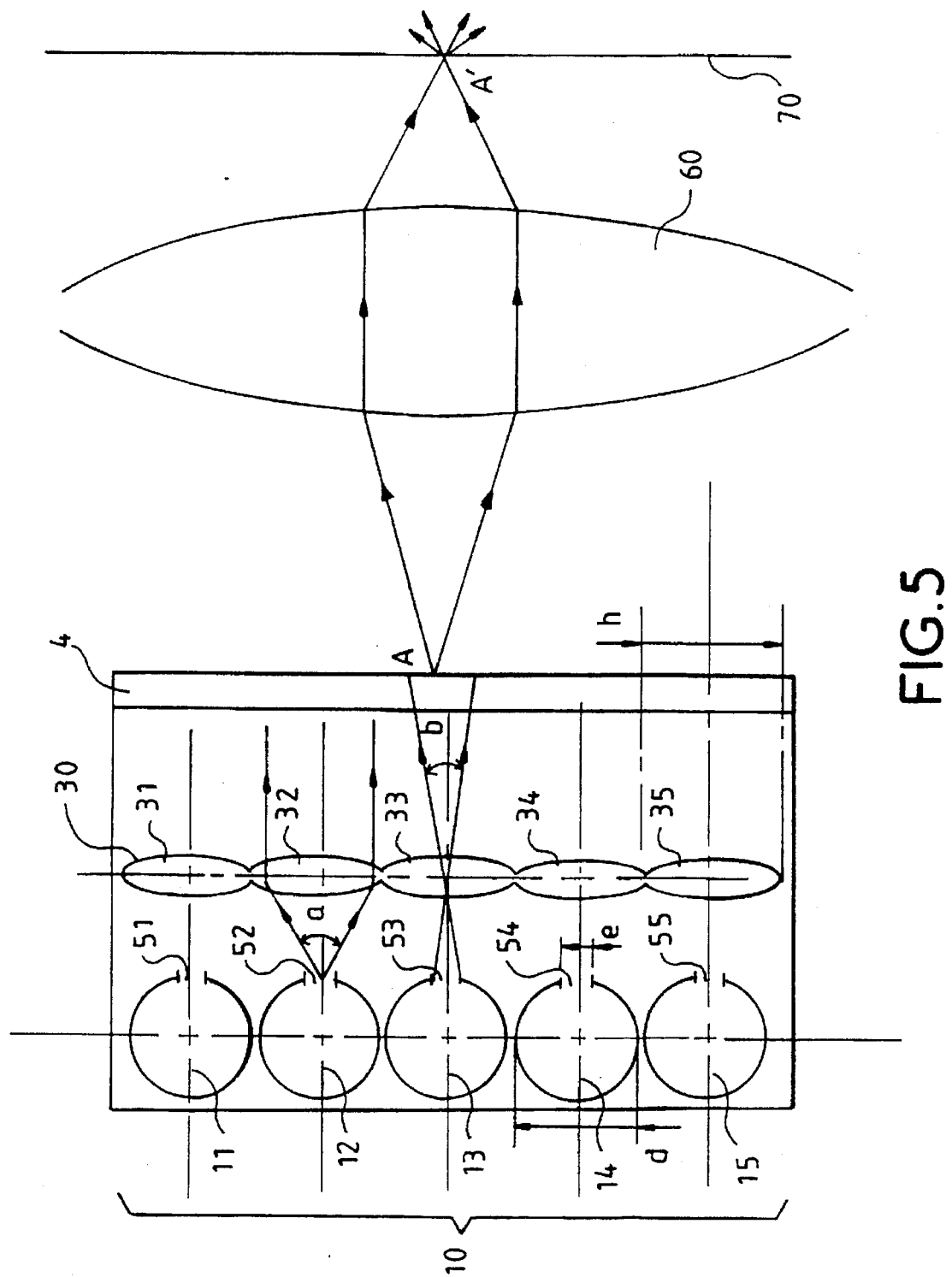
FIGS. 5 and 6 show a light box according to the invention adapted to the retro-illumination of a valve for projection, FIG. 5 pertaining to a black and white or monochromatic image and FIG. 6 pertaining to a color image with spatial synthesis.

An exemplary embodiment of a retro-illumination system for a color projector is shown in FIG. 5. The light box comprising the arrays of tubes 10 and lenses 30 has the same appearance as the one shown in FIG. 4. However, in the exemplary embodiment shown in FIG. 5, the values of the spacing v are zero. The planes of symmetry of the slots and lenses are merged. The divergence is low.

The projector is formed by an optical valve 4 of an objective 60 of projection and a scattering screen 70.

The objective gives an enlarged image V' of the valve V4 on the screen 70. This screen is a scattering screen so as to increase the divergence of the beam forming each point of the image V', like the point A' of FIG. 5 which is the image of the point A on the valve. Consequently, the radiation from the point A', after crossing the screen, reaches the observer's eye even if he or she is not facing the center of the screen.

The vertical valve 4 is retro-illuminated by an array 10 of fluorescent tubes 11, 12, 13, 14, 15 positioned in parallel to the axial direction and superimposed evenly along the vertical with a pitch "h" of 4 millimeters. They are sufficient in number to cover the entire height of the valve. An array of cylindrical lenses having the same pitch is interposed between the tubes and the valve. The focal distance "f" of each cylindrical lens having a height h equal to the pitch of the array (4 mm), given an aperture number of 1 namely an angle of aperture "a" given by:

a=2.arctan(h/2f), that is a=53 degrees is the distance between the slot of the tube and the corresponding lens so much so that the radiation coming from each lens is collimated in the vertical plane. The divergence "b" of the radiation after crossing the lens is given by:

b=2arctan(e/2f), that is b=6 degrees

This configuration is well suited to liquid crystal optical valves which, to obtain sufficient image quality, require retro-illumination that is perpendicular to the plane of the valve and slightly divergent. As explained with reference to FIG. 3c, in the longitudinal plane of symmetry, the illumination is not collimated. Although each point of the valve 4 is retro-illuminated throughout the length of the slot of the corresponding tube, the only rays that will pass through the objective 60 are rays close enough to the normal to the valve to be capable of passing into the pupil P of the projection objective (the telecentric objective whose input pupil, which is the image in the object space of the real pupil P, is at infinity and therefore lets through only rays that are slightly inclined with respect to the optical axis).

The valve is preferably chromatically neutral and is retro-illuminated by tubes of the same color, identical to the color of the image to be provided. The valve may also be polychromatic (spatial synthesis with a valve) and retro-illuminated by white tubes.

Should the projector give a polychromatic image and should it use three different recombined optical valves (three-valve spatial synthesis), a light box is positioned as described above with reference to FIGS. 4 and 5 behind each of the three optical valves. The images of each of these three valves is recombined in a known way, for example by means of a mixer cube, before being projected by the objective. Each of the three box contains tubes of the same color (red, green or blue).

Figure 6:
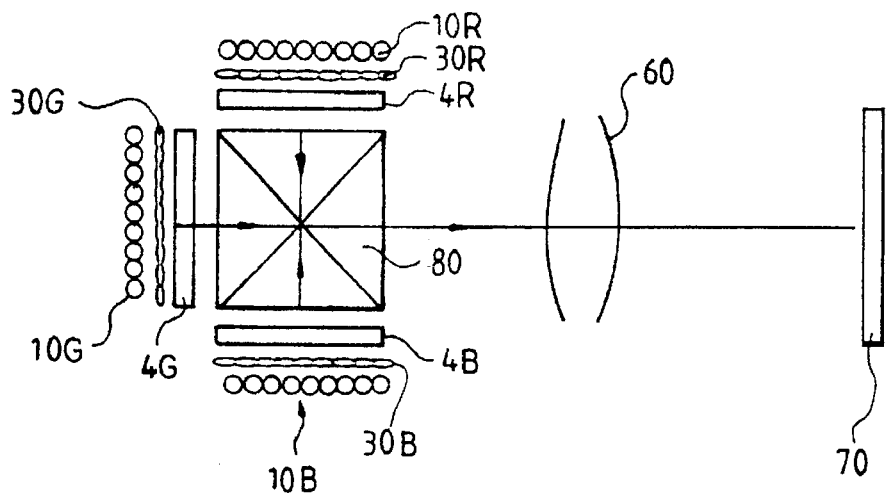

FIG. 6 gives a schematic view of such a system. As in the foregoing figures, the elements having the same function bear the same number. Indices R, G, B have been added to characterize the elements that take part in the generation of the colors red, green and blue.

Three valves 4R, 4G, 4B are positioned in a known way on three faces of a mixer cube 80. According to the invention, the light box has three illumination arrays. Each of these arrays is located behind the valve that it illuminates. There is thus an array 30R of lenses and 10R of tubes colored red for the illumination of the red valve 4R and similarly sets 30G and 10G of green tubes for the illumination of the green valve 4G and sets 30B and 10B of blue tubes for the illumination of the blue valve 4B.

Figure 7:
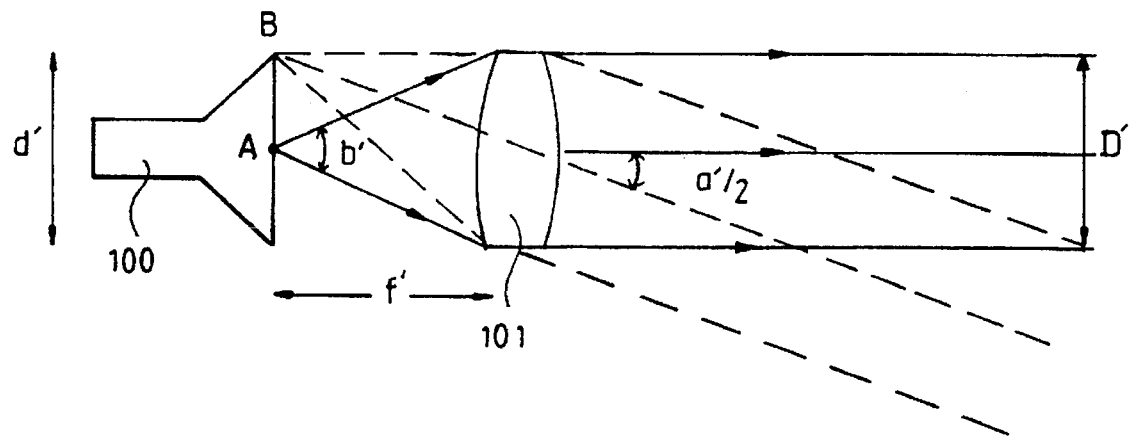
FIG. 7 shows a known type of head-up visor.

The use of a light box according to the invention to make a head-up visor shall now be explained with reference to FIGS. 7 and 8. In order to show the utility of the invention, the characteristics of a known visor shall be recalled here below with reference to FIG. 7.

A head-up visor is formed by an image source, conventionally a cathode-ray tube 100, and a collimator objective 101 forming the image of the image source at infinity. Unlike the projector, there is no scattering device between the objective and the observer, so much so that the region of space (eye box) where the image of a point A of the object field can be seen by the observer depends, for a cathode-ray tube visor, on the position of the point A with respect to the input pupil of the collimation objective. This input pupil is conventionally localized on the objective itself and its diameter is approximately equal to that of the objective. The following are the usual digital values:

diameter of the objective D'=130 mm, focal length of the objective f'=180 mm, diameter of the image source (CRT) d'=64 mm.

The total field of the visor, angle "a", at which the observer sees the image of the source is given by:

a'=2.arctan(d'/2f'), that is a'=20 degrees

The angle of aperture "b" of the objective (for a point A at the center of the field) is:

b'=2.arctan(D'/2f'), that is b'=40 degrees

These values result from a compromise between the value of the field, the quality of the image and the diameter of the objective.

According to the invention (FIG. 8), the visor is made with the same objective 101, the cathode-ray tube 100 is replaced by an optical valve 4 retro-illuminated by a set 10 of slotted fluorescent tubes. These fluorescent tubes are positioned in the axial reference direction and offset with respect to one another by a pitch h' that is variable from one tube to another. An array of cylindrical lenses 30 is interposed between the tubes and the valve 4. The optical valve technology used provides for adequate image quality, even for divergent retro-illumination. The fluorescent tubes are positioned preferably so as not to limit the size of the eye box in the horizontal dimension since, in this dimension, the illumination is not collimated. In the other dimension, to obtain an eye box with a desired size, it is possible to interpose a screen 90 with very low scattering between the lenses of the array 30 and the valve 4. This screen 90 is represented by dashes 90 in FIG. 8. According to what has been explained with reference to FIG. 3b, the offset between the position of the slot of a tube and the center of the lens corresponding to the lens array 30 is such that the radiation is directed towards the center of the collimation objective. This offset varies from zero at the center to a value e' at the end of the field, given by:

$e' = f \cdot \tan(a'/2)$ f designating the focal distance of the cylindrical array (4.8 mm) and a' the field of the visor (20°): the value obtained is e'=0.84 mm. In the case of a helmet visor (or head display) the above numerical values are different. The invention however is applicable.

Figure 8:
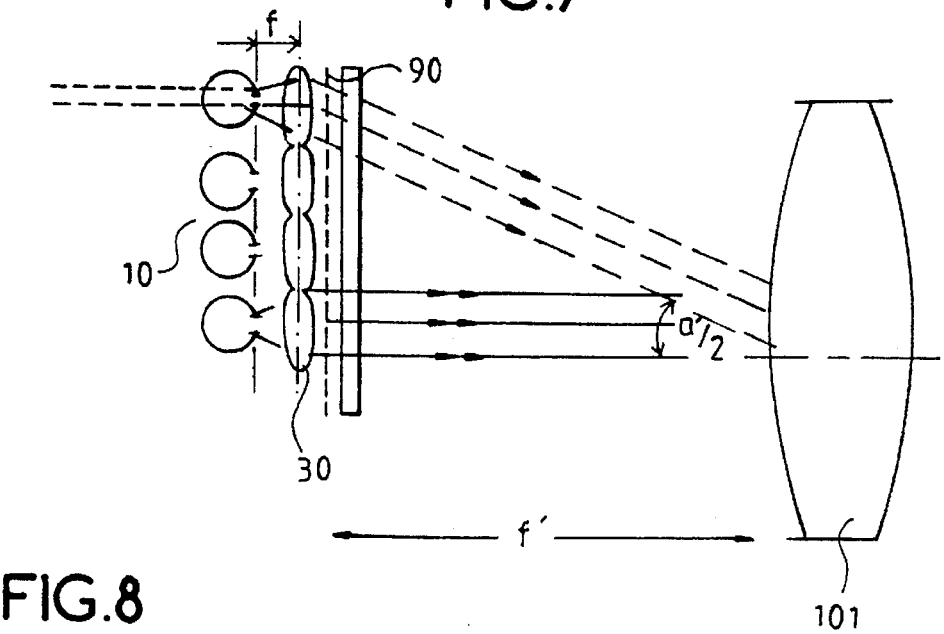
FIG. 8 shows a light box according to the invention adapted to the retro-illumination of a monochromatic valve for a head-up visor whose eye box is in the direction of the optical axis of the valve.

The embodiment described here above with reference to FIG. 8 enables a clear view of the image of the valve for an observer whose eye box is centered in the plane of symmetry of the valve.

When the center of this eye box is in a plane that is not the plane of symmetry of the valve but in a direction forming an angle α'/2 with this plane as shown in FIG. 3b, it is possible according to the invention firstly to offset all the planes of symmetry of the slots with respect to the plane of symmetry of the lenses by one and the same distance V. This distance V is shown in FIG. 3b. This first uniform offset locates the center of the eye box in a plane passing through the center of the valve, comprising the straight line of symmetry of the valve parallel to the axial direction of the tubes and forming an angle α/2 with the normal to the valve. Furthermore, if the eye box is close to the valve, it is possible to modulate the distance between each plane of symmetry of the slot and the plane of symmetry of the lens that corresponds to it.

Thus, if the center of the observer's eye box is such that the distance between the plane of symmetry of a slot and the plane of symmetry closest to a lens will increase from a reference plane that passes through the center of the eye box and is parallel to the axial direction of the tubes.

To enlarge the eye box, it is possible to add a scattering device 90" laid flat against the valve on the observer's side.

Figure 9:
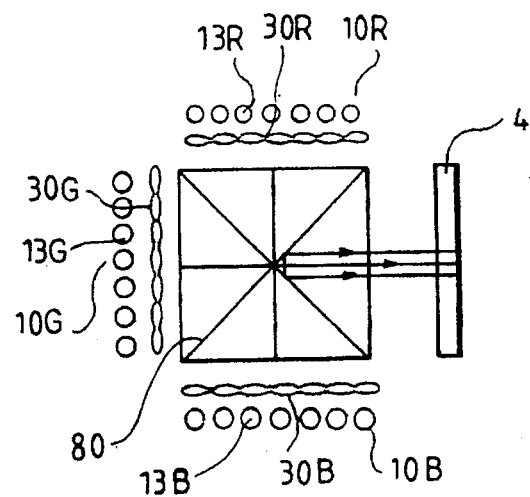
FIG. 9 shows the use of light boxes according to the invention for the making of a single-valve projector with temporal synthesis.
Figure 10:
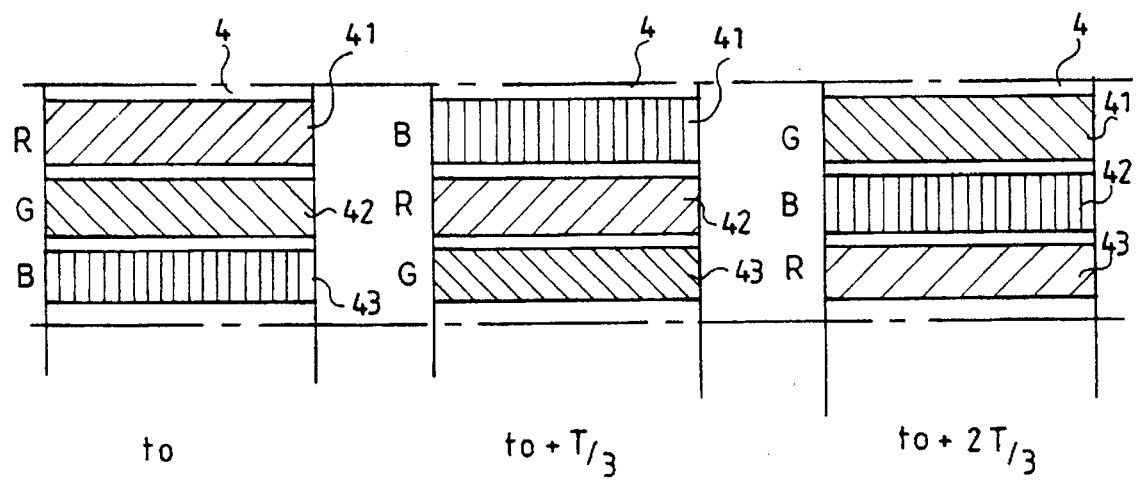
FIG. 10 shows a spatial view of the succession of operations of lighting up tubes for three consecutive zones.

The use of arrays 10 of tubes and arrays 30 of lenses for the sequential trichromatic retro-illumination of a single-valve projector shall now be commented upon with reference to FIGS. 9 and 10.

A sequential color retro-illumination device illuminating a single optical valve 4 is formed by three arrays 10R, 10G, 10B having the same number n of slotted fluorescent tubes, each associated with an array of lenses 30R, 30G, 30B. Each array is formed by tubes of the same color, red, green, blue. The three beams are combined to form a single beam by means of a mixer cube 80. The tubes of each array are supplied cyclically, during a fraction of the cycle. This fraction of the cycle has the same value for all the tubes, but the operations for lighting up the different tubes are phase-shifted with respect to one another. The essential point is that a horizontal zone of the valve 4, illuminated for example by the tube 13R of the red array 10R, the homologous tube 13G of the green array 10G and the homologous tube 13B of the blue array 10B respectively, is illuminated successively by each of these colors at a rate which is thrice the frequency of refreshing of the total image. Thus, if the image refreshing frequency is 60 Hz, each zone of the valve 4 should be illuminated 180 times per second, with three successive steps of illumination, one red, one green and one blue being carried out every 1/180th of a second. The operations of lighting up the tubes of one and the same color are phase-shifted with respect to one another so as to generate an oscillating (vertically for example) colored beam having a smaller cross-section than the surface of the valve. The tubes that are lit up simultaneously are spatially offset from one colored array to another so as to produce a temporal phase shift between the three oscillating colored beams.

FIG. 10 shows a temporal and spatial view of the succession of lighting-up operations for three consecutive zones 41, 42, 43 of a part of a valve 4. At the time $t_o$, the zone 41 is illuminated by one or more red tubes and the pixels of this zone are controlled to represent the red part of the image on this zone. The zone 42 is similarly illuminated green and the zone 43 blue. At the time to+T/$_3$ and to+2T/$_3$, T representing the period of an image, a circular permutation of the three colors between the three zones is carried out.

What is claimed is:

1. A light box for an optical valve with a plane surface, the box comprising a light source emitting a light beam, constituted by at least one plane array of n fluorescent tubes having longitudinal slots, the slots having longitudinal planes of symmetry perpendicular to the plane of the valve and parallel to one another, each of said at least one plane array having a condenser orienting the light beam with respect to the surface of the valve, the condenser being constituted by a number n of longitudinal lenses equal to the number of slotted tubes, each lens having a plane of optical symmetry parallel to the planes of symmetry of the slots, each lens being located between a respective one of said slots and the surface of the valve, the distance between the plane of symmetry of a slot of a tube and the plane of symmetry of a lens closest to this plane of symmetry of the slot being non-decreasing with the distance from the plane of symmetry of the slot to a plane of reference parallel to the planes of symmetry of the lenses and the slots.

2. A light box according to claim 1, wherein the lenses and the tubes of each array are positioned in such a way that a plane of optical symmetry of a lens containing the axial direction is also the plane of symmetry of a slot of a tube.

3. A use of three valves, each illuminated by a light box according to claim 2 for the obtaining of a three-valve spatial synthesis.

4. A use of a valve according to claim 2, for the making of an image projector.

5. A use of a valve according to claim 2, for the making of a head-up visor.

6. A use of a valve according to claim 2, for the making of a system of display in direct viewing mode.

7. A light box according to claim 1, comprising a scattering screen between the array of lenses and the valve.

8. A use of three valves, each illuminated by a light box according to claim 7 for the obtaining of a three-valve spatial synthesis.

9. A use of a valve according to claim 7, for the making of an image projector.

10. A use of a valve according to claim 7, for the making of a head-up visor.

11. A use of a valve according to claim 7, for the making of a system of display in direct viewing mode.

12. A light box according to claim 2, comprising three arrays of tubes associated with three arrays of lenses, each array of tubes comprising tubes of the same color, this color being different from that of the other two arrays, and means directing the light at output of each of the arrays of lenses towards one and the same valve.

13. A use of three valves, each illuminated by a light box according to claim 1 for the obtaining of a three-valve spatial synthesis.

14. A use of a valve according to claim 1, for the making of an image projector.

15. A use of a valve according to claim 1, for the making of a head-up visor.

16. A use of a valve according to claim 1, for the making of a system of display in direct viewing mode.

* * * * *